US011425616B2

(12) United States Patent
Kim

(10) Patent No.: US 11,425,616 B2
(45) Date of Patent: Aug. 23, 2022

(54) METHOD AND APPARATUS FOR UPDATING SECURITY KEY IN WIRELESS COMMUNICATION SYSTEM

(71) Applicant: Samsung Electronics Co., Ltd., Suwon-si (KR)

(72) Inventor: Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 17/072,812

(22) Filed: Oct. 16, 2020

(65) Prior Publication Data

US 2021/0120466 A1 Apr. 22, 2021

Related U.S. Application Data

(60) Provisional application No. 62/916,351, filed on Oct. 17, 2019.

(51) Int. Cl.
*H04W 4/00* (2018.01)
*H04W 36/00* (2009.01)
*H04W 4/70* (2018.01)
*H04W 12/0433* (2021.01)

(52) U.S. Cl.
CPC ......... *H04W 36/0069* (2018.08); *H04W 4/70* (2018.02); *H04W 12/0433* (2021.01)

(58) Field of Classification Search
None
See application file for complete search history.

(56) References Cited

U.S. PATENT DOCUMENTS

| 9,646,300 | B1 | 5/2017 | Zhou et al. |
| 9,830,589 | B2 | 11/2017 | Xing |
| 2011/0294508 | A1 | 12/2011 | Min et al. |
| 2015/0341833 | A1* | 11/2015 | Palanisamy ........... H04W 48/20 455/436 |
| 2016/0366175 | A1* | 12/2016 | Basu Mallick ....... H04W 76/15 |
| 2019/0014509 | A1* | 1/2019 | Nakarmi ........... H04W 12/0431 |

(Continued)

OTHER PUBLICATIONS

QUALCOMM Incorporated, ARFCN for security key derivation, R2-1913394, 3GPP TSG-RAN WG2 Meeting#107bis, Chongqing, China, Oct. 4, 2019, sections 1-3; and figure 1.

(Continued)

*Primary Examiner* — Zewdu A Beyen
(74) *Attorney, Agent, or Firm* — Jefferson IP Law, LLP

(57) ABSTRACT

A communication technique and a system for fusing a $5^{th}$-generation (5G) or pre-5G communication system for supporting a higher data rate than that of a $4^{th}$-generation (4G) communication system, such as long-term evolution (LTE), with Internet of things (IoT) technology is provided. The communication technique includes an intelligent services (e.g., a smart home, a smart building, a smart city, a smart car or a connected car, healthcare, digital education, retail, security- and safety-related services, and the like), based on 5G communication technology and IoT-related technology. Moreover, a method and an apparatus for updating a security key in a wireless communication system are provided.

14 Claims, 10 Drawing Sheets

(56) References Cited

U.S. PATENT DOCUMENTS

2019/0215861 A1   7/2019  Son

OTHER PUBLICATIONS

Sharp, Validity of CHO configurations based on security configuration, R2-1913668, 3GPP TSG-RAN WG2 Meeting#107bis, Chongqing, China, Oct. 4, 2019, sections 1-3; and figures 1A-2B.
Futurewei, Timing of Key Derivation in Conditional Handover, R2-1913513, 3GPP TSG-RAN WG2 Meeting#107bis, Chongqing, China, Oct. 4, 2019, section 2.
International Search Report dated Jan. 22, 2021, issued in International Application No. PCT/KR2020/014133.

\* cited by examiner

METHOD AND APPARATUS FOR UPDATING SECURITY KEY IN WIRELESS COMMUNICATION SYSTEM

CROSS-REFERENCE TO RELATED APPLICATION(S)

This application is based on and claims priority under 35 U.S.C. § 119(e) of a U.S. provisional application Ser. No. 62/916,351, filed on Oct. 17, 2019, in the U.S. Patent and Trademark Office, the disclosure of which is incorporated by reference herein in its entirety.

BACKGROUND

1. Field

The disclosure relates to a method and an apparatus for updating a security key in a wireless communication system. More specifically, the disclosure relates to a method for, when a control message indicating handover includes several absolute radio frequency channel numbers (ARFCNs) and several physical cell identities (PCIs), selecting one PCI and one ARFCN to derive a new security key.

2. Description of the Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a "Beyond 4G Network" or a "Post long term evolution (LTE) System".

The 5G communication system is considered to be implemented in higher frequency millimeter (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

For the 5G system, studies are being conducted to support a wider variety of services than the existing 4G system. For example, the most representative services of the 5G system include an enhanced mobile broadband (eMBB) service, an ultra-reliable and low latency communication (URLLC) service, a massive machine type communication (mMTC) service, an evolved multimedia broadcast/multicast service (eMBMS), and the like. Further, a system for providing the URLLC service may be referred to as a URLLC system, and a system for providing the eMBB service may be referred to as an eMBB system. In addition, the terms "service" and "system" may be used interchangeably.

Among these services, the URLLC service is a service that is newly considered in the 5G system, in contrast to the existing 4G system, and requires to satisfy ultrahigh reliability (e.g., packet error rate of about 10-5) and low latency (e.g., about 0.5 msec) conditions compared to the other services. In order to satisfy such strict requirements, the URLLC service may need to apply a transmission time interval (TTI) that is shorter than that of the eMBB service, and various operating methods using this are under consideration.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

The above information is presented as background information only to assist with an understanding of the disclosure. No determination has been made, and no assertion is made, as to whether any of the above might be applicable as prior art with regard to the disclosure.

SUMMARY

An embodiment proposes a method wherein, when a handover in which several physical cell identities (PCIs) and several absolute radio frequency channel numbers (ARFCNs) are involved is performed in a wireless communication system, a terminal and a base station update a security key by using the same PCI and ARFCN.

The technical issues to be addressed in the disclosure are not limited to the above described technical issues, and other technical issues that have not been mentioned may be clearly understood by those skilled in the art from the following description.

Aspects of the disclosure are to address at least the above-mentioned problems and/or disadvantages and to provide at least the advantages described below. Accordingly, an aspect of the disclosure is to provide an apparatus and a method for updating a security key in a wireless communication system.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes receiving, from a base station, a message including information on at least one serving cell, determining whether the message includes a first absolute radio frequency channel number (ARFCN) for a specific serving cell, and determining a first key for a master cell group based on a first physical cell identity (PCI) for the specific serving cell and the first ARFCN for the specific serving cell, in case that the message includes the first ARFCN for the specific serving cell.

In an embodiment of the disclosure, the method further comprises determining the first key for the master cell group based on the first PCI for the specific serving cell and a second ARFCN used to determine a current first key for the master cell group, in case that the message does not include the first ARFCN for the specific serving cell.

In an embodiment of the disclosure, the method further comprises identifying that the message includes information for indicating whether the first PCI and the first ARFCN is used to determine the first key, and determining the first key based on a current first key for the master cell group, in case that the information indicates the first PCI and the first ARFCN is not used to determine the first key.

In an embodiment of the disclosure, the determining whether the message includes the first ARFCN for a specific serving cell comprises: determining whether the message includes the first ARFCN for a specific serving cell, in case that the information indicates the first PCI and the first ARFCN is used to determine the first key.

In an embodiment of the disclosure, the information on the at least one serving cell comprises the first PCI and two ARFCN for the specific serving cell.

In an embodiment of the disclosure, the first ARFCN among the two ARFCN indicates a center frequency of the specific serving cell and a second ARFCN indicates a lower end frequency of the specific serving cell.

In an embodiment of the disclosure, the specific serving cell is a primary cell of the master cell group.

In an embodiment of the disclosure, the first ARFCN for the specific serving cell is listed in the message prior to an ARFCN for other serving cell.

In accordance with another aspect of the disclosure, a terminal in a wireless communication system is provided. The terminal includes a transceiver, and a controller configured to receive, from a base station via the transceiver, a message including information on at least one serving cell, determine whether the message includes a first absolute radio frequency channel number (ARFCN) for a specific serving cell, and determine a first key for a master cell group based on a first physical cell identity (PCI) for the specific serving cell and the first ARFCN for the specific serving cell, in case that the message includes the first ARFCN for the specific serving cell.

According to an embodiment of the disclosure, a terminal and a base station update a security key by using the same PCI and ARFCN, so as to prevent breakdown of a service due to mismatch of the security key.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the LTE and NR standards, which are the latest standards defined by the $3^{rd}$ generation partnership project long term evolution (3GPP LTE) group, for the convenience of description. However, the disclosure is not limited by these terms and names, and may be applied in the same way to systems that conform other standards. More particularly, the disclosure may be applied to the 3GPP NR (or $5^{th}$ generation/5G mobile communication standard).

Figure 1A:
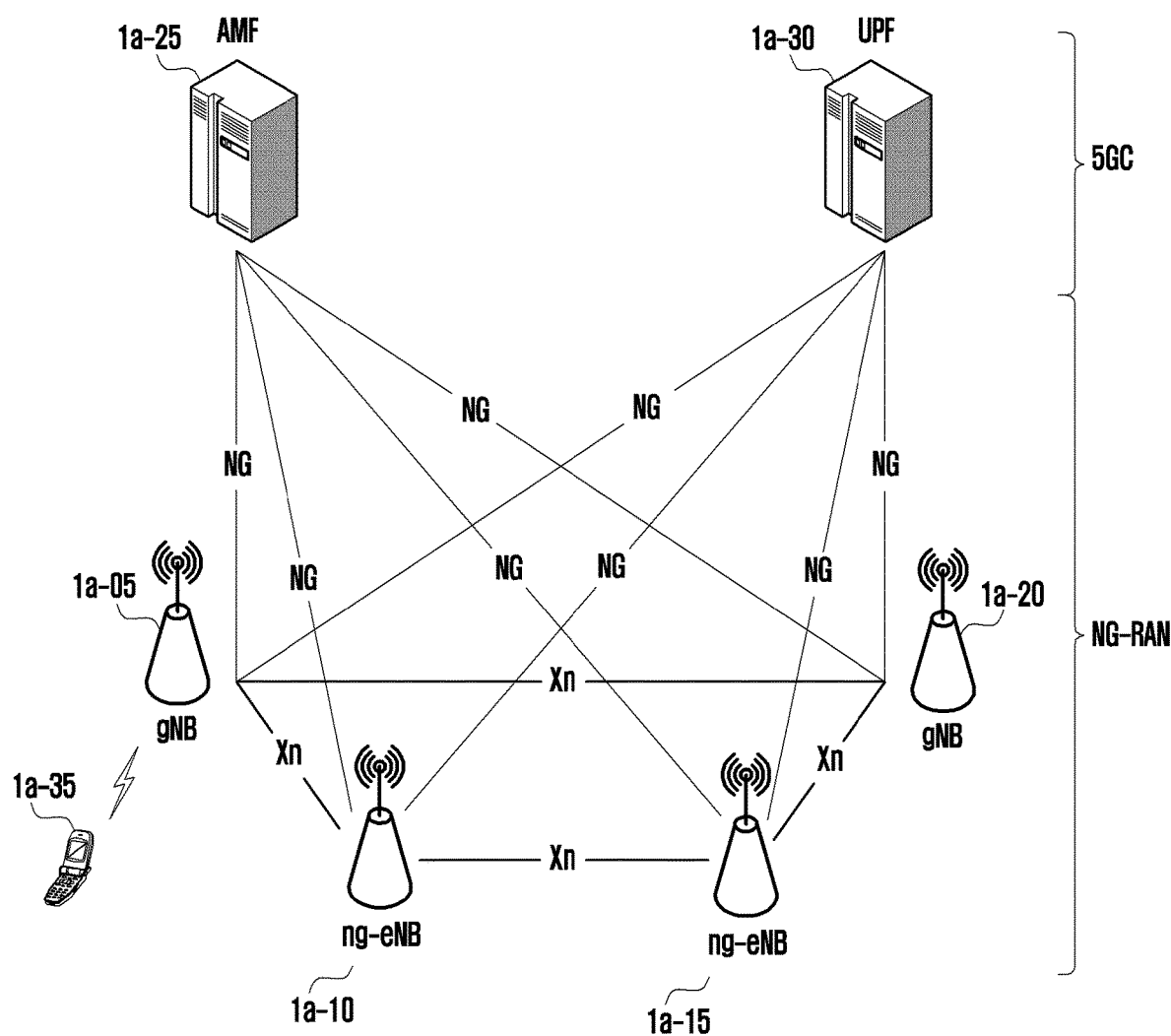
FIG. 1A illustrates a structure of a new radio (NR) system according to an embodiment of the disclosure.

FIG. 1A illustrates a structure of an NR system according to an embodiment of the disclosure.

Referring to FIG. 1A, a wireless communication system may be configured by several base stations 1a-05, 1a-10, 1a-15, and 1a-20, an access and mobility management function (AMF) 1a-25, and a user plan function (UPF) 1a-30. A user equipment (hereinafter, UE or terminal) 1a-35 may access an external network through the base stations 1a-05, 1a-10, 1a-15, and 1a-20 and the UPF 1a-30.

The base stations 1a-05, 1a-10, 1a-15, and 1a-20 serve as access nodes of a cellular network, and provides a wireless access to UEs accessing the network. For example, in order to service traffic of users, the base stations 1a-05, 1a-10, 1a-15, and 1a-20 collect state information of UEs 1a-35, such as a buffer state, an available transfer power state, and a channel state and perform scheduling, so as to support a connection between the UEs 1a-35 and a core network (CN. More particularly, a CN of NR is referred to as a 5GC). In communications, a user plane (UP) related to transmission of real user data and a control plane (CP) such as connection management may be separately configured. In FIG. 1A, the gNBs 1a-05 and 1a-20 use UP and CP technology defined in NR technology, and although the ng-eNBs 1a-10 and 1a-15 are connected to a 5GC, the ng-eNBs use UP and CP technology defined in LTE technology.

The AMF/SMF 1a-25 is a device configured to perform various control functions as well as a mobility management function for a UE, and is connected to multiple base stations. The UPF 1a-30 is kind of a gateway device providing data transmission.

Figure 1B:
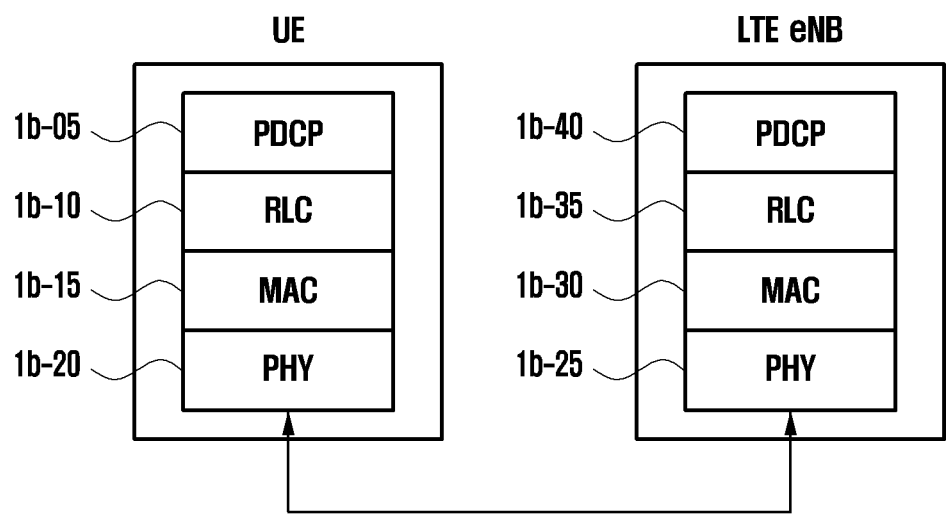
FIG. 1B illustrates a wireless protocol structure in long term evolution (LTE) and NR systems according to an embodiment of the disclosure.

FIG. 1B illustrates a wireless protocol structure in LTE and NR systems according to an embodiment of the disclosure.

Referring to FIG. 1B, the wireless protocol of the LTE and NR systems includes packet data convergence protocols (PDCPs) 1b-05 and 1b-40, radio link controls (RLCs) 1b-10 and 1b-35, and medium access controls (MACs) 1b-15 and 1b-30, for a UE and an eNB/gNB, respectively. Each of the packet data convergence protocols (PDCPs) 1b-05 and 1b-40 is configured to perform an operation such as IP header compression/reconstruction, and each of the radio link controls (hereinafter, referred to as RLCs) 1b-10 and 1b-35 reconfigures a protocol data unit (PDCP PDU) to be a proper size. Each of the MACs 1b-15 and 1b-30 is connected to several RLC layer devices configured in a single UE, and multiplexes RLC PDUs to a MAC PDU, and demultiplexes a MAC PDU to RLC PDUs. Each of physical layers (PHYs) 1b-20 and 1b-25 performs channel coding and modulation on upper layer data to make the data into an OFDM symbol and transmit the OFDM symbol through a wireless channel, or performs demodulation and channel decoding on an OFDM symbol received through a wireless channel, and then transfers the OFDM symbol to an upper layer. In addition, the physical layer also uses a hybrid automatic repeat request (ARQ) (HARQ) for additional error correction, and a receiver transmits information relating to whether a packet transmitted by a transmitter is received, the information size being one bit. The information is referred to as HARQ ACK/NACK information. Downlink HARQ ACK/NACK information for uplink data transmission is transmitted through a physical hybrid-ARQ indicator channel (PHICH) in LTE. In NR, whether retransmission is required, and whether to perform new transmission may be determined through scheduling information of a corresponding UE in a physical downlink control channel (PDCCH) which is a channel through which downlink/uplink resource allocation is transmitted. This is because NR employs asynchronous HARQ. Uplink HARQ ACK/NACK information for downlink data transmission may be transmitted through a physical uplink control channel (PUCCH) or a physical uplink shared channel (PUSCH). In general, a PUCCH is transmitted in the uplink in a PCell, which is described later. However, if there is a support by a UE, a base station may additionally transmit the PUCCH to the UE even in an SCell, which is described later, and the SCell in this case is called a PUCCH SCell.

Although not illustrated in FIG. 1B, radio resource control (RRC) layers exist above the PDCP layers of the UE and the base station, respectively, and the RRC layers may exchange an access/measurement-related configuration control message for wireless resource control.

Each of the PHY layers 1b-20 and 1b-25 may be configured by one or multiple frequencies/carriers, and a technology in which one base station configures multiple frequencies at once and then uses the multiple frequencies is called carrier aggregation (hereinafter, referred to as CA) technology. Method of using only one carrier for communication between a terminal (or user equipment or UE) and a base station (an eNB in LTE, or a gNB in NR), CA technology additionally uses one or multiple secondary carriers as well as primary carrier, and thus can remarkably increase traffics in proportion to the number of the secondary carriers according to the related art. In LTE, a cell in a base station, using a main carrier, is called a PCell (primary cell), and a secondary carrier is called a SCell (secondary cell). A technology extending the CA function described above to two base station is called dual connectivity technology (hereinafter, referred to as DC). In the DC technology, a UE uses a master base station (a master E-UTRAN nodeB (MeNB) or a master node (MN)), and a secondary base station (a secondary E-UTRAN nodeB (SeNB) or a secondary node (SN)) together while connecting to both of them, and cells belonging to the master base station are called a master cell group (hereinafter, referred to as an MCG), and cells belonging to the secondary base station are called a secondary cell group (hereinafter, referred to as an SCG). There is a representative cell in each cell group, and the representative cell of the master cell group is called a primary cell (a PCell or a SpCell (special cell) of the master cell group), and the representative cell of the secondary cell group is called a primary secondary cell (a PSCell or a primary SCG cell). If NR described above is used, the MCG is used through LTE technology and the SCG is used through NR, so that a UE can use both LTE and NR. In NR, there may be a maximum of 16 serving cells (a PCell or SCells in an MCG, and a PSCell and SCells in an SCG) in each cell group (i.e., an MCG or SCG).

Although not illustrated in FIG. 1B, radio resource control (RRC) layers exist above the PDCP layers 1b-05 and 1b-40 of the UE and the base station, respectively, and the RRC layers may exchange an access/measurement-related configuration control message for wireless resource control. For example, measurement may be indicated to the UE by using a message from the RRC layer, and the UE may report a result of the measurement to the base station by using a message from the RRC layer.

Figure 1C:
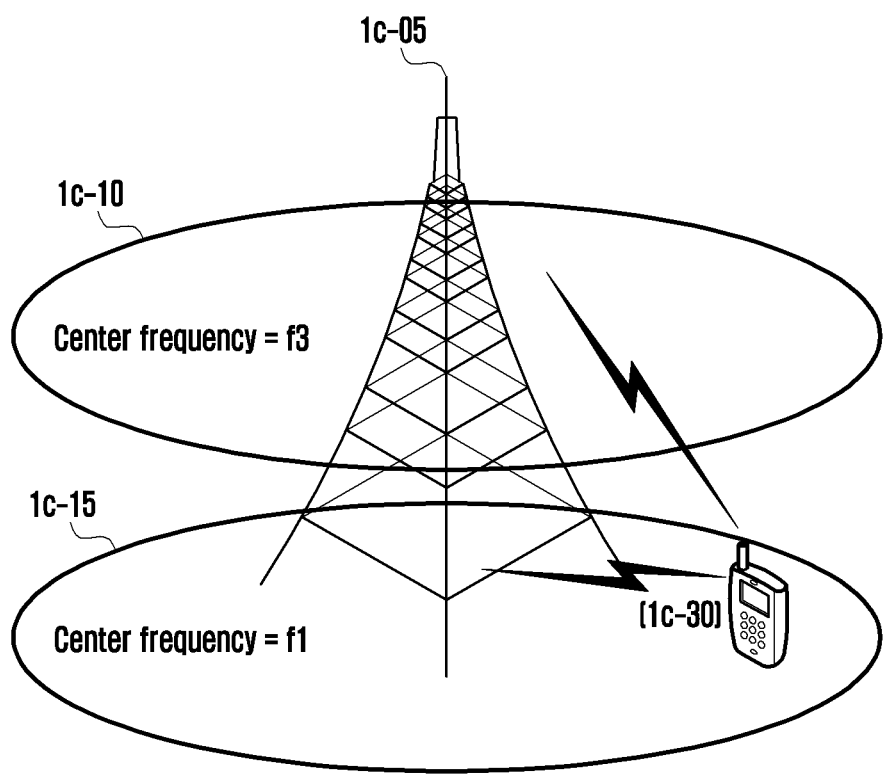
FIG. 1C is a diagram illustrating carrier aggregation in a user equipment (UE) according to an embodiment of the disclosure.

FIG. 1C is a diagram illustrating carrier aggregation technology in a UE according to an embodiment of the disclosure.

Referring to FIG. 1C, one base station 1c-05 generally transmits and receives multi-carriers over several frequency bands. For example, when the base station 1c-05 transmits a carrier 1c-15 having a center frequency of f1, and a carrier 1c-10 having a center frequency of f3, one UE 1c-30 transmits or receives data by using one carrier among the two carriers in the method of the related art. However, the UE 1c-30 having a carrier aggregation ability may transmit or receive data from several carriers at the same time. The base station 1c-05 may assign more carriers to the UE 1c-30 having the carrier aggregation ability according to a situation, so as to increase the transmission speed of the UE 1c-30.

If one forward-link carrier and one reverse-link carrier that are transmitted and received by one base station 1c-05 configure a single cell, carrier aggregation may be also interpreted as transmitting or receiving data through several cells at the same time by the UE 1c-30 of the related art. Therefore, the maximum transmission speed increases proportionally with the number of aggregated carriers.

Hereinafter, in describing the disclosure, the fact that a UE receives data through a random forward-link carrier, or transmits data through a random reverse-link carrier may imply the same meaning as the fact that the UE transmits or receives the data by using a control channel and a data channel provided in a cell corresponding to the center frequency and the frequency band characterizing the carrier. In addition, for convenience of explanation, embodiments below will be explained under an assumption of an LTE system, but the disclosure may be applied to various types of wireless communication systems supporting carrier aggregation.

Security is one of most important feature that mobile communication should provide. To achieve the required level of security, ciphering/deciphering and integrity protection are applied to the data packets exchanged in the air interface. Security function is performed in the PDCP layer, hence those operations like ciphering/deciphering/integrity protection are applied to PDCP SDUs (service data units).

A security key is required to be generated by using various inputs so that a third party is unable to derive the security key. For example, the inputs may be frequency information (an ARFCN), a PCI, and the like. A base station indicates updating of a master key by transmitting a predetermined control message to a UE. If the control message includes only one PCI and one piece of frequency information, the UE and the base station update the master key by using identical inputs. For reference, the master key has a concept in contrast to that of a secondary key, and means a security key applied in a master cell group of the UE.

It may be efficient to include several PCIs and several pieces of frequency information in one control message. For example, if the base station configures carrier aggregation while indicating updating of a key through a single control message, the control message may include as many PCIs as newly configured serving cells and as many pieces of frequency indicators as the newly configured serving cells. In addition, it may be efficient to include multiple pieces of frequency information in one serving cell. For example, it may be required that both frequency information indicating the center frequency of a cell and frequency information indicating the boundary frequency of the cell are included. The frequency information is indicated by an absolute radio frequency channel number (ARFCN).

The disclosure provides a method and an apparatus for using, for key updating, a predetermined PCI and a predetermined piece of frequency information among multiple PCIs and multiple pieces of frequency information, so as to indicate key updating through a control message including the multiple PCIs and the multiple pieces of frequency information. More specifically, a UE applies, to key updating, a PCI satisfying a predetermined condition among multiple PCIs, and applies, to key updating, a piece of frequency information satisfying a predetermined condition among multiple pieces of frequency information.

Figure 1D:
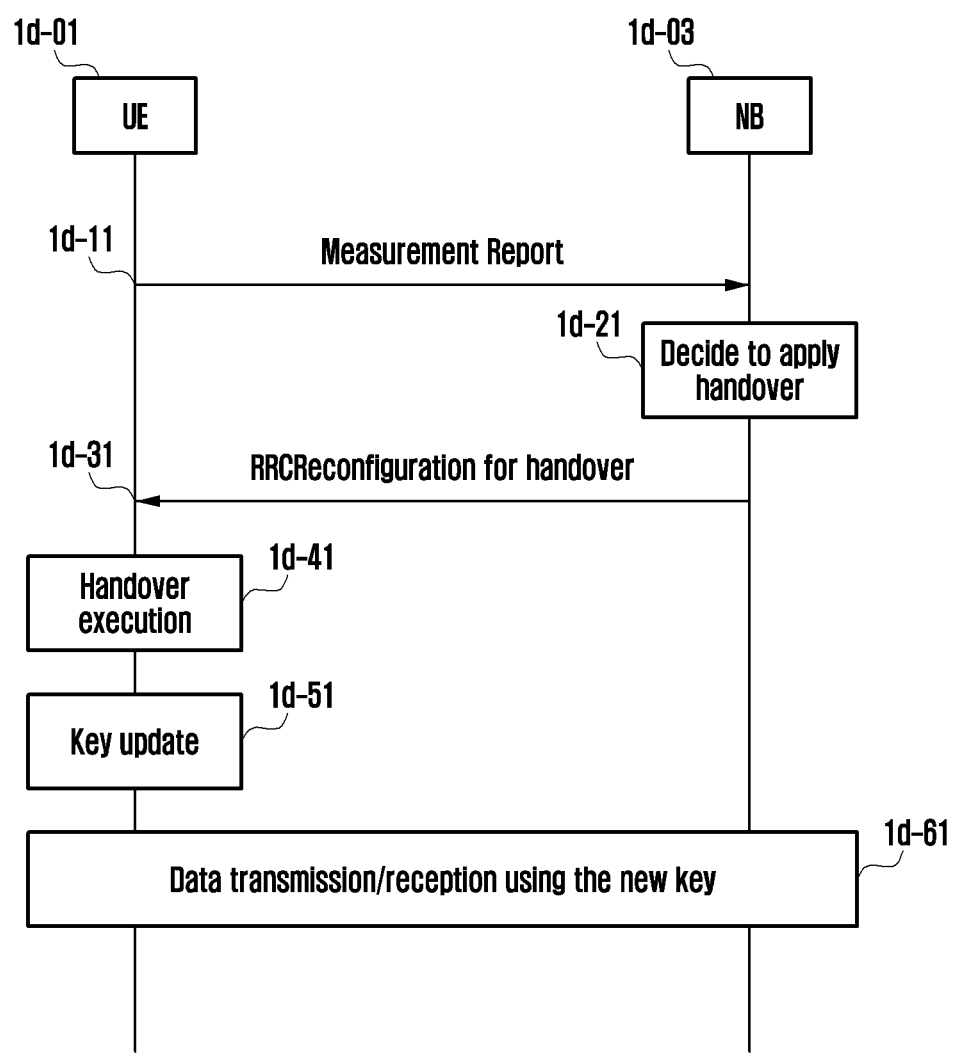
FIG. 1D illustrates a procedure of a UE and a base station, related to key updating at a time of a handover according to an embodiment of the disclosure.

FIG. 1D illustrates a procedure of a UE and a base station, related to key updating at a time of a handover according to an embodiment of the disclosure.

Referring to FIG. 1D, a UE 1d-01 reports a measurement report including a measurement result to a base station 1d-03 in operation 1d-11. By referring to the message including information such as the wireless quality of a neighboring cell, the base station 1d-03 may perform the following operations related to determination on whether to perform a handover in operation 1d-21.

Determination on whether to perform a handover: For example, if the wireless channel quality of the neighboring cell is better than the wireless channel quality of the current cell, the base station 1d-03 may determine to perform a handover of a target cell to the neighboring cell.

Determination on a type of the handover: The base station 1d-03 may determine the type of the handover by considering a performance of the UE 1d-01, a traffic type, and a load of a cell.

Determination on PCIs and ARFCNs to be included in a RRCReconfiguration message After the handover, the base station 1d-03 may determine PCIs and ARFCNs to be included, by considering whether carrier aggregation is applied.

Determination on whether to perform key updating, and a type of the key updating: The base station 1d-03 may determine whether to perform key updating by considering a base station controlling the target cell.

Determination on a PCI and an ARFCN to be applied to key updating: The base station 1d-03 may determine whether to perform key updating by considering a frequency of the target cell.

Determination on a position where a PCI and an ARFCN for key updating are stored: The base station 1d-03 stores a PCI to be used for key updating as the foremost PCI among PCIs to be included in the RRC Reconfiguration message. The base station 1d-03 may store an ARFCN to be used for key updating as the foremost ARFCN among ARFCNs to be included in the RRC reconfiguration message.

The base station 1d-03 may transmit an RRC reconfiguration message indicating a handover to the UE 1d-01 in operation 1d-31. The RRC reconfiguration message may include several PCIs and several ARFCNs, and may include information specifying a type of the handover.

The UE 1d-01 may start an RRC reconfiguration procedure related to the handover at a proper time point according to the type of the indicated handover in operation 1d-41. If the type is the 1$^{st}$ type or the 2$^{nd}$ type, the UE 1d-01 may start a handover procedure immediately when the RRC reconfiguration message indicating the handover is received. If the type is the 3$^{rd}$ type, the UE 1d-01 may start a handover procedure when a predetermined condition is satisfied after the RRC reconfiguration message indicating the handover is received.

The UE 1d-01 performs key updating in operation 1d-51. Key updating of the UE 1d-01 and key updating of the base station 1d-03 may be performed at different time points. A key updating procedure includes the stages: deriving a new key and applying the new key. The UE 1d-01 may perform key updating at the time point of the handover, and the base station 1d-03 may derive a new key in operation 1d-11 and apply the new key when the handover starts.

When the UE 1d-01 derives a key, the UE may select a PCI and an ARFCN determined according to a predetermined rule according to the type of the handover, and input the selected PCI and ARFCN to a key derivation function.

The UE 1d-01 and the base station 1d-03 may apply the new key to perform data transmission/reception in operation 1d-61.

Figure 1E:
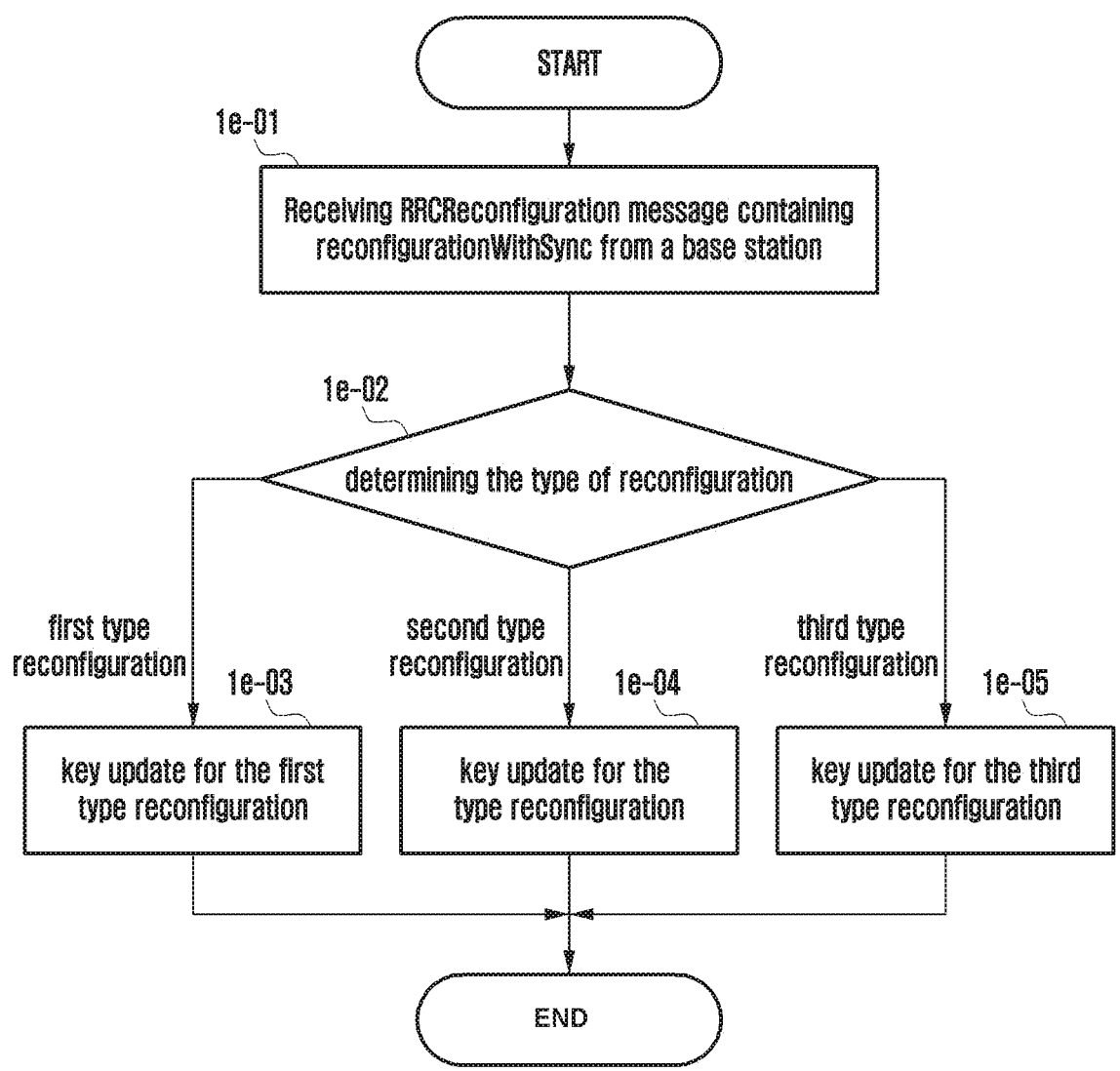
FIG. 1E is a diagram illustrating a UE operation performed at a time of key updating according to an embodiment of the disclosure.

FIG. 1E is a diagram illustrating a UE operation performed at a time of key updating according to an embodiment of the disclosure.

Referring to FIG. 1E, the UE receives RRCReconfiguration message containing reconfigurationWithSync from a base station in operation 1e-01.

The UE determines the type of reconfiguration in operation 1e-02. The UE determines the type of reconfiguration based on the presence of specific indication in the reconfiguration message. If first information (i.e., reconfigurationWithSync type 2 indicator) is included, it is the second type reconfiguration. If second information (conditional reconfigurationWithSync related information) is included, it is the third type reconfiguration. If none of above but only reconfigurationWithSync is included, it is the first type reconfiguration.

If it is first type reconfiguration, the UE performs the key update for the first type reconfiguration in operation 1e-03.

If it is second type reconfiguration, the UE performs the key update for the second type reconfiguration in operation 1e-04.

If it is third type reconfiguration, the UE performs the key update for the third type reconfiguration in operation 1e-05.

RRCReconfiguration message can include the following information.

```
RRCReconfiguration-v1530-IEs ::=             SEQUENCE {
    masterCellGroup                          OCTET STRING (CONTAINING
CellGroupConfig)                             OPTIONAL, -- Need M
    fullConfig                               ENUMERATED {true}
OPTIONAL, -- Cond FullConfig
    dedicatedNAS-MessageList                 SEQUENCE (SIZE(1..maxDRB)) OF
DedicatedNAS-Message                         OPTIONAL, -- Cond nonHO
    masterKeyUpdate                          MasterKeyUpdate
OPTIONAL, -- Cond MasterKeyChange
    dedicatedSIB1-Delivery                   OCTET STRING (CONTAINING SIB1)
OPTIONAL, -- Need N
    dedicatedSystemInformationDelivery                   OCTET STRING (CONTAINING
SystemInformation)                           OPTIONAL, -- Need N
    otherConfig                              OtherConfig
OPTIONAL, -- Need M
    nonCriticalExtension                     RRCReconfiguration-v1540-IEs
OPTIONAL
}
RRCReconfiguration-v1610-IEs ::=             SEQUENCE {
    otherConfig-v1610                        OtherConfig-v1610
OPTIONAL, -- Need M
    bap-Config-r16                           SetupRelease { BAP-Config-r16 }
OPTIONAL, -- Need M
    iab-IP-AddressConfigurationList-r16              IAB-IP-AddressConfigurationList-r16
OPTIONAL, -- Need M
    conditionalReconfiguration-r16           ConditionalReconfiguration-r16
OPTIONAL, -- Need M
    daps-SourceRelease-r16                   ENUMERATED{true}
OPTIONAL, -- Need N
    t316-r16                                 SetupRelease {T316-r16}
OPTIONAL, -- Need M
    needForGapsConfigNR-r16                          SetupRelease {NeedForGapsConfigNR-r16}
OPTIONAL, -- Need M
    onDemandSIB-Request-r16                          SetupRelease { OnDemandSIB-Request-r16
}           OPTIONAL, -- Need M
    dedicatedPosSysInfoDelivery-r16                  OCTET STRING (CONTAINING
PosSystemInformation-r16-IEs)                OPTIONAL, -- Need N
    sl-ConfigDedicatedNR-r16                 SetupRelease {SL-ConfigDedicatedNR-r16}
OPTIONAL, -- Need M
    sl-ConfigDedicatedEUTRA-Info-r16                 SetupRelease {SL-
ConfigDedicatedEUTRA-Info-r16}                       OPTIONAL, -- Need M
    nonCriticalExtension                     SEQUENCE {}
OPTIONAL
}
``` reconfigurationWithSync type 2 indicator is daps-Config in RadioBearerConfig. second information is conditional-Reconfiguration.

MasterKeyUpdate can include the following information.

```
MasterKeyUpdate ::=          SEQUENCE {
    keySetChangeIndicator    BOOLEAN,
```

-continued

```
    nextHopChainingCount     NextHopChainingCount,
    nas-Container            OCTET STRING
OPTIONAL, -- Cond securityNASC
    ...
}
```

CellGroupConfig and ServingCellConfigCommon can include the following information

```
-- ASN1START
-- TAG-CELLGROUPCONFIG-START
-- Configuration of one Cell-Group:
CellGroupConfig ::=                             SEQUENCE {
    cellGroupId                                 CellGroupId,
    rlc-BearerToAddModList                              SEQUENCE (SIZE(1..maxLC-ID)) OF
RLC-BearerConfig                                OPTIONAL, -- Need N
    rlc-BearerToReleaseList                             SEQUENCE (SIZE(1..maxLC-ID)) OF
LogicalChannelIdentity                          OPTIONAL, -- Need N
    mac-CellGroupConfig                                 MAC-CellGroupConfig
OPTIONAL, -- Need M
    physicalCellGroupConfig                     PhysicalCellGroupConfig
OPTIONAL, -- Need M
    spCellConfig                                SpCellConfig
OPTIONAL, -- Need M
    sCellToAddModList                                   SEQUENCE(SIZE (1..maxNrofSCells)) OF
SCellConfig                                     OPTIONAL, -- Need N
    sCellToReleaseList                                  SEQUENCE (SIZE (1..maxNrofSCells)) OF
SCellIndex                                      OPTIONAL, -- Need N
    ...,
    [[
    reportUplinkTxDirectCurrent                 ENUMERATED {true}
OPTIONAL -- Cond BWP-Reconfig
    ]],
    [[
    bap-Address-r16                             BIT STRING (SIZE (10))
OPTIONAL, -- Need M
    bh-RLC-ChannelToAddModList-r16                      SEQUENCE (SIZE(1..maxBH-RLC-
ChannelID-r16)) OF BH-RLC-ChannelConfig-r16 OPTIONAL, -- Need N
    bh-RLC-ChannelToReleaseList-r16                     SEQUENCE (SIZE(1..maxBH-RLC-
ChannelID-r16)) OF BH-RLC-ChannelID-r16   OPTIONAL, -- Need N
    f1c-TransferPath-r16                        ENUMERATED {lte, nr, both}
OPTIONAL, -- Need M
    simultaneousTCI-UpdateList1-r16                     SEQUENCE (SIZE
(1..maxNrofServingCellsTCI-r16)) OF ServCellIndex    OPTIONAL, -- Need R
    simultaneousTCI-UpdateList2-r16                     SEQUENCE (SIZE
(1..maxNrofServingCellsTCI-r16)) OF ServCellIndex    OPTIONAL, -- Need R
    simultaneousSpatial-UpdatedList1-r16                SEQUENCE (SIZE
(1..maxNrofServingCellsTCI-r16)) OF ServCellIndex    OPTIONAL, -- Need R
    simultaneousSpatial-UpdatedList2-r16                SEQUENCE (SIZE
(1..maxNrofServingCellsTCI-r16)) OF ServCellIndex    OPTIONAL, -- Need R
    uplinkTxSwitchingOption-r16                 ENUMERATED {switchedUL, dualUL}
OPTIONAL    -- Need R
    ]]
}
-- Serving cell specific MAC and PHY parameters for a SpCell:
SpCellConfig ::=                                SEQUENCE {
    servCellIndex                               ServCellIndex
OPTIONAL, -- Cond SCG
    reconfigurationWithSync                     ReconfigurationWithSync
OPTIONAL, -- Cond ReconfWithSync
    rlf-TimersAndConstants                      SetupRelease { RLF-TimersAndConstants }
OPTIONAL, -- Need M
    rlmInSyncOutOfSyncThreshold                 ENUMERATED {n1}
OPTIONAL, -- Need S
    spCellConfigDedicated                       ServingCellConfig
OPTIONAL, -- Need M
    ...
}
ReconfigurationWithSync ::=                     SEQUENCE {
    spCellConfigCommon                          ServingCellConfigCommon
OPTIONAL, -- Need M
    newUE-Identity                              RNTI-Value,
    t304                                        ENUMERATED {ms50, ms100, ms150, ms200, ms500,
ms1000, ms2000, ms10000},
    rach-ConfigDedicated                        CHOICE {
        uplink                                  RACH-ConfigDedicated,
        supplementaryUplink                             RACH-ConfigDedicated
```

-continued

```
        }                                                           OPTIONAL, --Need
N
    ...,
    [[
        smtc                    SSB-MTC                             OPTIONAL
-- Need S
    ]],
    [[
        daps-UplinkPowerConfig-r16        DAPS-UplinkPowerConfig-r16
OPTIONAL    -- Need N
    ]]
}
DAPS-UplinkPowerConfig-r16 ::=                 SEQUENCE {
    p-DAPS-Source-rl6              P-Max,
    p-DAPS-Target-rl6              P-Max,
    uplinkPowerSharingDAPS-Mode-r16           ENUMERATED {semi-static-mode1,
semi-static-mode2, dynamic }
}
SCellConfig ::=            SEQUENCE {
    sCellIndex              SCellIndex,
    sCellConfigCommon                 ServingCellConfigCommon
OPTIONAL, -- Cond SCellAdd
    sCellConfigDedicated              ServingCellConfig
OPTIONAL, -- Cond SCellAddMod
    ...,
    [[
        smtc                    SSB-MTC                             OPTIONAL
-- Need S
    ]],
    [[
        sCellState-r16          ENUMERATED {activated}
OPTIONAL, -- Cond SCellAddSync
        secondaryDRX-GroupConfig-r16              ENUMERATED {true}
OPTIONAL -- Cond DRX-Config2
    ]]}
-- TAG-CELLGROUPCONFIG-STOP
-- ASN1STOP
ServingCellConfigCommon ::=                 SEQUENCE {
    physCellId              PhysCellId
OPTIONAL, -- Cond HOAndServCellAdd,
    downlinkConfigCommon                  DownlinkConfigCommon
OPTIONAL, -- Cond HOAndServCellAdd
    uplinkConfigCommon              UplinkConfigCommon
OPTIONAL, -- Need M
    supplementaryUplinkConfig               UplinkConfigCommon
OPTIONAL, -- Need S
    n-TimingAdvanceOffset           ENUMERATED { n0, n25600, n39936 }
OPTIONAL, -- Need S
    ssb-PositionsInBurst            CHOICE {
        shortBitmap             BIT STRING (SIZE (4)),
        mediumBitmap              BIT STRING (SIZE (8)),
        longBitmap              BIT STRING (SIZE (64))
    }                                                               OPTIONAL, --
Cond AbsFreqSSB
    ssb-periodicityServingCell              ENUMERATED { ms5, ms10, ms20, ms40, ms80,
ms160, spare2, spare1 }         OPTIONAL, -- Need S
    dmrs-TypeA-Position             ENUMERATED {pos2, pos3},
    lte-CRS-ToMatchAround              SetupRelease { RateMatchPatternLTE-CRS }
OPTIONAL, -- Need M
    rateMatchPatternToAddModList              SEQUENCE (SIZE
(1..maxNrofRateMatchPatterns)) OF RateMatchPatternId OPTIONAL, -- Need N
    rateMatchPatternToReleaseList             SEQUENCE (SIZE
(1..maxNrofRateMatchPatterns)) OF RateMatchPatternId OPTIONAL, -- Need N
    ssbSubcarrierSpacing              SubcarrierSpacing
OPTIONAL, -- Cond HOAndServCellWithSSB
    tdd-UL-DL-ConfigurationCommon             TDD-UL-DL-ConfigCommon
OPTIONAL, -- Cond TDD
    ss-PBCH-BlockPower              INTEGER (-60..50),
    ...,
    [[
        channelAccessMode-r16             CHOICE {
            dynamic             NULL,
            semiStatic              SemiStaticChannelAccessConfig
        }                                                           OPTIONAL, --
Cond SharedSpectrum
        discoveryBurstWindowLength-r16            ENUMERATED {ms0dot5, ms1, ms2,
ms3, ms4, ms5}       OPTIONAL, -- Need M
        ssb-PositionQCL-r16             SSB-PositionQCL-Relation-r16
OPTIONAL, -- Cond SharedSpectrum
```

```
    highSpeedConfig-r16                          HighSpeedConfig-r16
OPTIONAL -- Need R
    ]]
}
-- TAG-SERVINGCELLCONFIGCOMMON-STOP
-- ASN1STOP
```

Figure 1F:
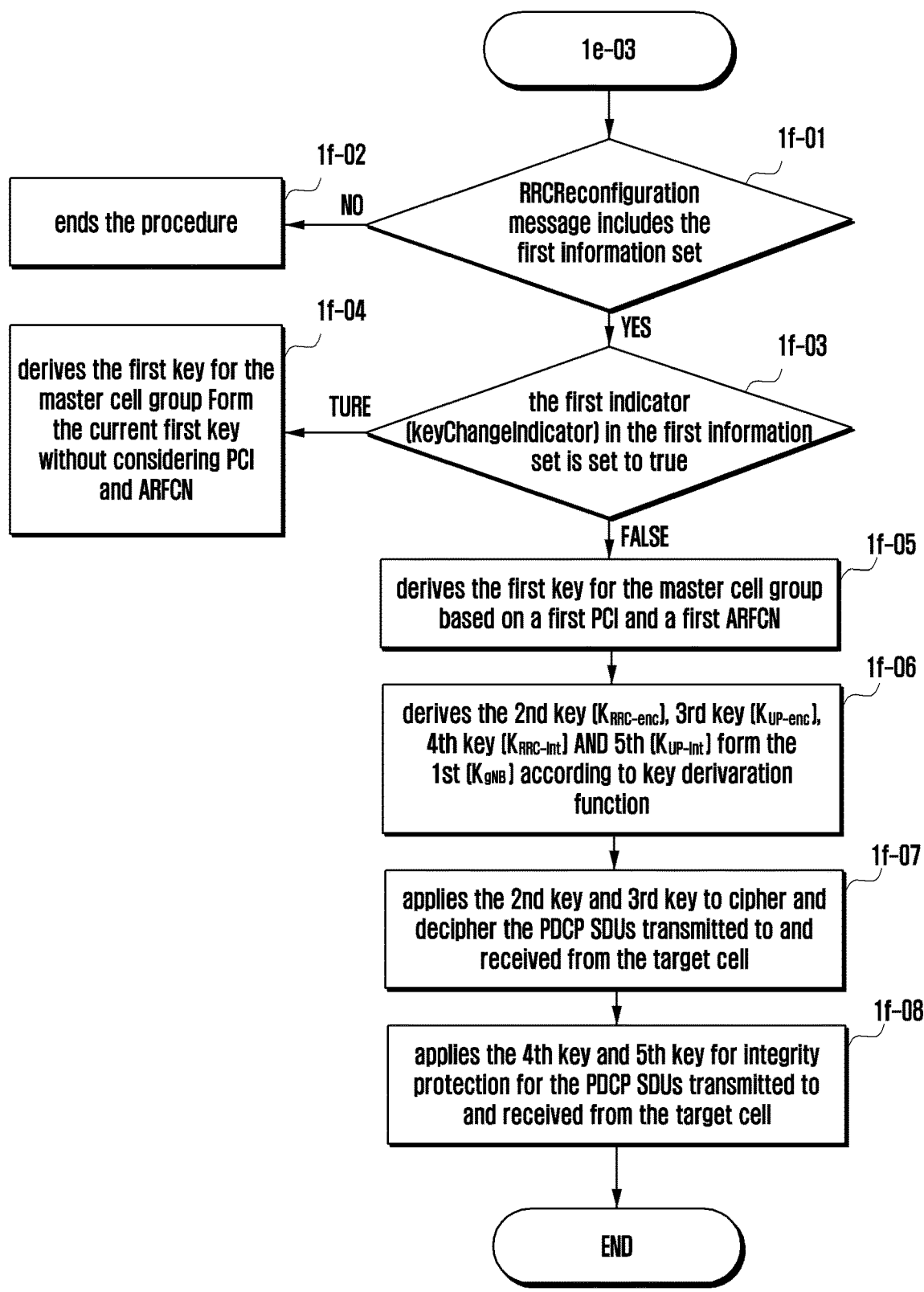
FIG. 1F is a diagram depicting a UE operation for key updating in $1^{st}$ type reconfiguration according to an embodiment of the disclosure.

FIG. 1F is a diagram depicting a UE operation for key updating in $1^{st}$ type reconfiguration according to an embodiment of the disclosure.

Referring to FIG. 1F, the UE determines whether RRCReconfiguration message includes the first information set (masterKeyUpdate) related to key update for the master cell group operation 1*f*-01.

If the RRCReconfiguration message does not include the first information set, the UE ends the key update procedure without key update operation 1*f*-02.

If the RRCReconfiguration includes the first information set, the UE goes to operation 1*f*-03 to start key update procedure The UE determines whether the first indicator (keyChangeIndicator) in the first information set is set to true operation 1*f*-03.

If it is set to true, the UE derives the first key for the master cell group without considering PCI and ARFCN operation 1*f*-04. More specifically, the first key for the master cell group is derived from the current first key using a specific KDF (Key Derivation Function).

If the first indicator in the first information set is set to false, the UE derives the first key for the master cell group based on a first PCI and a first ARFCN among multiple PCIs and multiple ARFCNs contained in the message operation 1*f*-05. The first PCI is the PCI included in the 1st IE of the RRCReconfiguration message. RRCReconfiguration message can include multiple PCIs. A PCI can be included in the 1st IE, 2nd IE, 3rd IE or 4th IE. The 1st IE is spCellConfigCommon in reconfigurationWithSync in spCellConfig in cellGroupConfig for masterCellGroup. The $1^{st}$ IE is the set of information on the primary cell of master cell group after handover. The 2nd IE is sCellConfigCommon in sCellToAddModList in CellGroupConfig for masterCellGroup. The $2^{nd}$ IE is the set of information on the secondary cells to be used after handover. The 3rd IE is spCellConfigCommon in reconfigurationWithSync in spCellConfig in cellGroupConfig for mrdc-SecondaryCellGroupConfig. The $3^{rd}$ IE is set of information on the primary cell of secondary cell group. The 4th IE is sCellConfigCommon in sCellToAddModList in CellGroupConfig for mrdc-SecondaryCellGroupConfig. The $4^{th}$ IE is set of information on the secondary cells of secondary cell group. The first ARFCN is the first ARFCN indicated in the 5th IE (FrequencyInfoDL within spCellConfigCommon within reconfigurationWithSync within spCellConfig within CellGroupConfig for master cell group) of the RRCReconfiguration message if the 5th IE is included in the RRCReconfiguration message. A RRCReconfiguration message can include multiple ARFCNs as followings. Two ARFCNs can be included in 5th IE, 6th IE, 7th IE and 8th IE. The first ARFCN indicates the center frequency of a cell (or center frequency of reference signal representing the cell). The second ARFCN indicates the lower end frequency of a cell. The 5th IE is FrequencyInfoDL in spCellConfigCommon in reconfigurationWithSync in spCellConfig in cellGroupConfig for masterCellGroup. The $5^{th}$ IE is subset of $1^{st}$ IE and includes frequency relation information for a specific cell corresponding to $1^{st}$ IE. The 6th IE is FrequencyInfoDL in sCellConfigCommon in sCellToAddModList in CellGroupConfig for masterCellGroup. The $6^{th}$ IE is subset of $2^{nd}$ IE and includes frequency relation information for a specific cell corresponding to $2^{nd}$ IE. The 7th IE is FrequencyInfoDL in spCellConfigCommon in reconfigurationWithSync in spCellConfig in cellGroupConfig for mrdc-SecondaryCellGroupConfig. The $7^{th}$ IE is subset of $3^{rd}$ IE and includes frequency relation information for a specific cell corresponding to $3^{rd}$ IE. The 8th IE is FrequencyInfoDL in sCellConfigCommon in sCellToAddModList in CellGroupConfig for mrdc-SecondaryCellGroupConfig. The $8^{th}$ IE is subset of $4^{th}$ IE and includes frequency relation information for a specific cell corresponding to $4^{th}$ IE. The first ARFCN is the ARFCN having used to derive the current first key for the master cell group if the 5th IE is not included in the RRCReconfiguration message The UE derives the 2nd key ($K_{RRC-enc}$), 3rd key ($K_{UP-enc}$), 4th key ($K_{RRC-int}$) and 5th key ($K_{UP-int}$) from the 1st key ($K_{gNB}$) according to key derivation function operation 1*f*-06.

The UE applies the 2nd key and 3rd key to cipher and decipher the PDCP SDUs transmitted to and received from the target cell operation 1*f*-07.

The UE applies the 4th key and 5th key for integrity protection for the PDCP SDUs transmitted to and received from the target cell operation 1*f*-08.

Figure 1G:
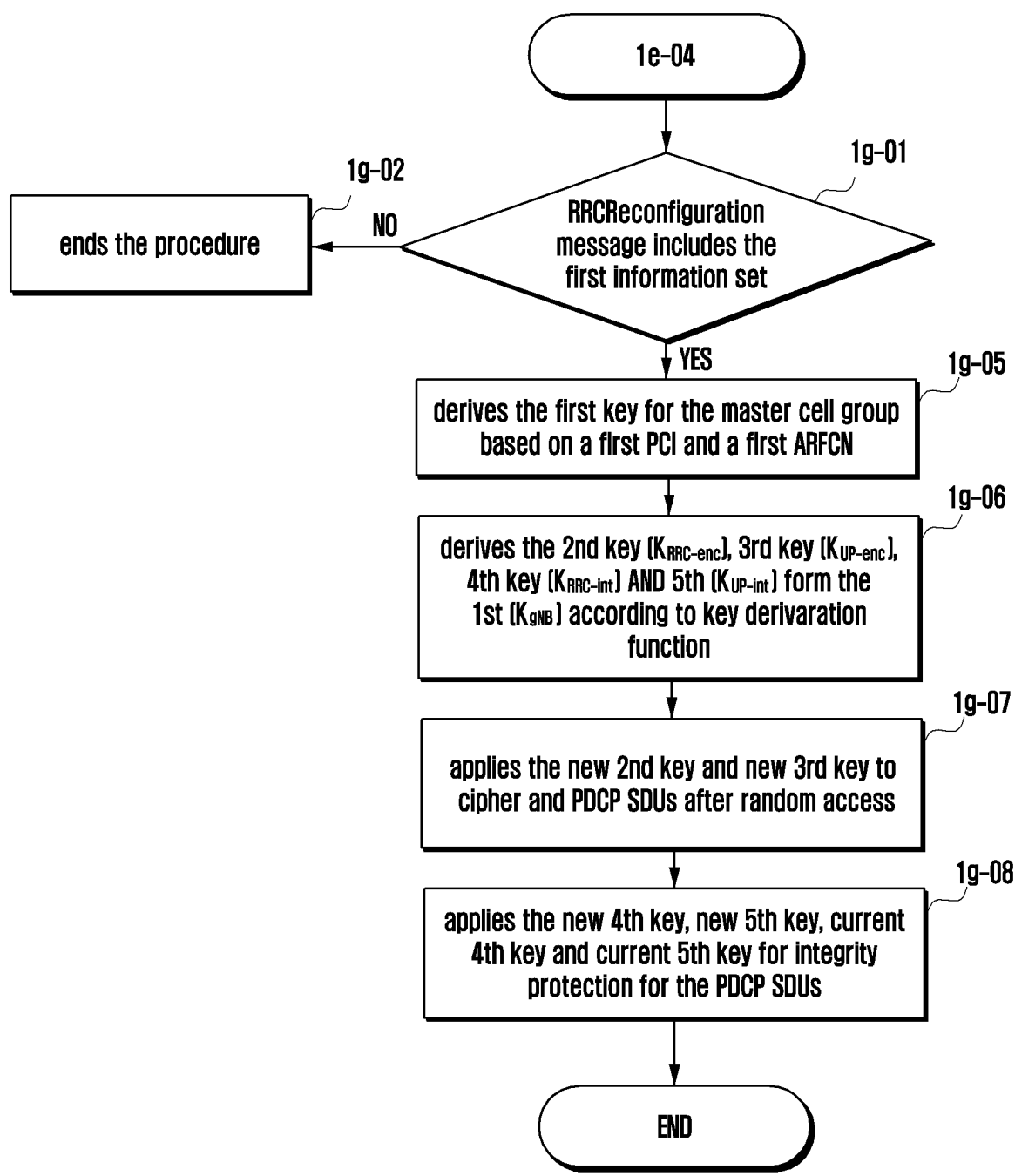
FIG. 1G is a diagram depicting a UE operation for key updating in $2^{nd}$ type reconfiguration according to an embodiment of the disclosure.

FIG. 1G is a diagram depicting a UE operation for key updating in $2^{nd}$ type reconfiguration according to an embodiment of the disclosure.

Referring to FIG. 1G, the UE determines whether RRCReconfiguration message includes the first information set (masterKeyUpdate) related to key update for the master cell group operation 1*g*-01.

If the RRCReconfiguration message does not include the first information set, the UE ends the key update procedure without key update operation 1*g*-02.

If the RRCReconfiguration message includes the first information set, the UE goes to 1*g*-05 to start key update procedure.

The UE derives the first key for the master cell group based on a first PCI and a first ARFCN among multiple PCIs and multiple ARFCNs contained in the message operation 1*g*-05. The first PCI is the PCI included in the 1st IE of the RRCReconfiguration message. RRCReconfiguration message can include multiple PCIs. A PCI can be included in the 1st IE, 2nd IE, 3rd IE or 4th IE. The 1st IE is spCellConfigCommon in reconfigurationWithSync in spCellConfig in cellGroupConfig for masterCellGroup. The $1^{st}$ IE is the set of information on the primary cell of master cell group after handover. The 2nd IE is sCellConfigCommon in sCellToAddModList in CellGroupConfig for masterCellGroup. The $2^{nd}$ IE is the set of information on the secondary cells to be used after handover. The 3rd IE is spCellConfigCommon in reconfigurationWithSync in spCellConfig in cellGroupConfig for mrdc-SecondaryCellGroupConfig. The $3^{rd}$ IE is set of information on the primary cell of secondary cell group. The 4th IE is sCellConfigCommon in sCellToAddModList in CellGroupConfig for mrdc-SecondaryCellGroupConfig. The 4th IE is set of information on the secondary cells of secondary cell group. The first ARFCN is the first ARFCN indicated in the 5th IE (FrequencyInfoDL within spCellConfigCommon within reconfigurationWithSync within spCellConfig within CellGroupConfig for master cell group) of the RRCReconfiguration message if the 5th IE is included in the RRCReconfiguration message. A RRCReconfiguration message can include multiple ARFCNs as followings. Two ARFCNs can be included in 5th IE, 6th IE, 7th IE and 8th IE. The first ARFCN indicates the center frequency of a cell (or reference signal representing the cell). The second ARFCN indicates the lower end frequency of a cell. The 5th IE is FrequencyInfoDL in spCellConfigCommon in reconfigurationWithSync in spCellConfig in cellGroupConfig for masterCellGroup. The $5^{th}$ IE is subset of $1^{st}$ IE and includes frequency relation information for a specific cell corresponding to $1^{st}$ IE. The 6th IE is FrequencyInfoDL in sCellConfigCommon in sCellToAddModList in CellGroupConfig for masterCellGroup. The $6^{th}$ IE is subset of $2^{nd}$ IE and includes frequency relation information for a specific cell corresponding to $2^{nd}$ IE. The 7th IE is FrequencyInfoDL in spCellConfigCommon in reconfigurationWithSync in spCellConfig in cellGroupConfig for mrdc-SecondaryCellGroupConfig. The $7^{th}$ IE is subset of $3^{rd}$ IE and includes frequency relation information for a specific cell corresponding to $3^{rd}$ IE. The 8th IE is FrequencyInfoDL in sCellConfigCommon in sCellToAddModList in CellGroupConfig for mrdc-SecondaryCellGroupConfig. The $8^{th}$ IE is subset of $4^{th}$ IE and includes frequency relation information for a specific cell corresponding to $4^{th}$ IE. The first ARFCN is the ARFCN having used to derive the current first key for the master cell group if the 5th IE is not included in the RRCReconfiguration message The UE derives the 2nd key ($K_{RRC-enc}$), 3rd key ($K_{UP-enc}$), 4th key ($K_{RRC-int}$) and 5th key ($K_{UP-int}$) from the 1st key ($K_{gNB}$) according to key derivation function operation 1g-06.

The UE applies the new 2nd key and new 3rd key to cipher the PDCP SDUs after random access in the target cell is successfully completed and applies the current 2nd key and current 3rd key to cipher the PDCP SDUs before random access in the target cell is successfully completed operation 1g-07.

The UE applies the new 4th key, new 5th key, current 4th key and current 5th key for integrity protection for the PDCP SDUs operation 1g-08. New keys are applied to the PDCP SDUs transmitted to and received from the target cell. Current keys are applied to the PDCP SDUs transmitted to and received from the source cell.

Figure 1H:
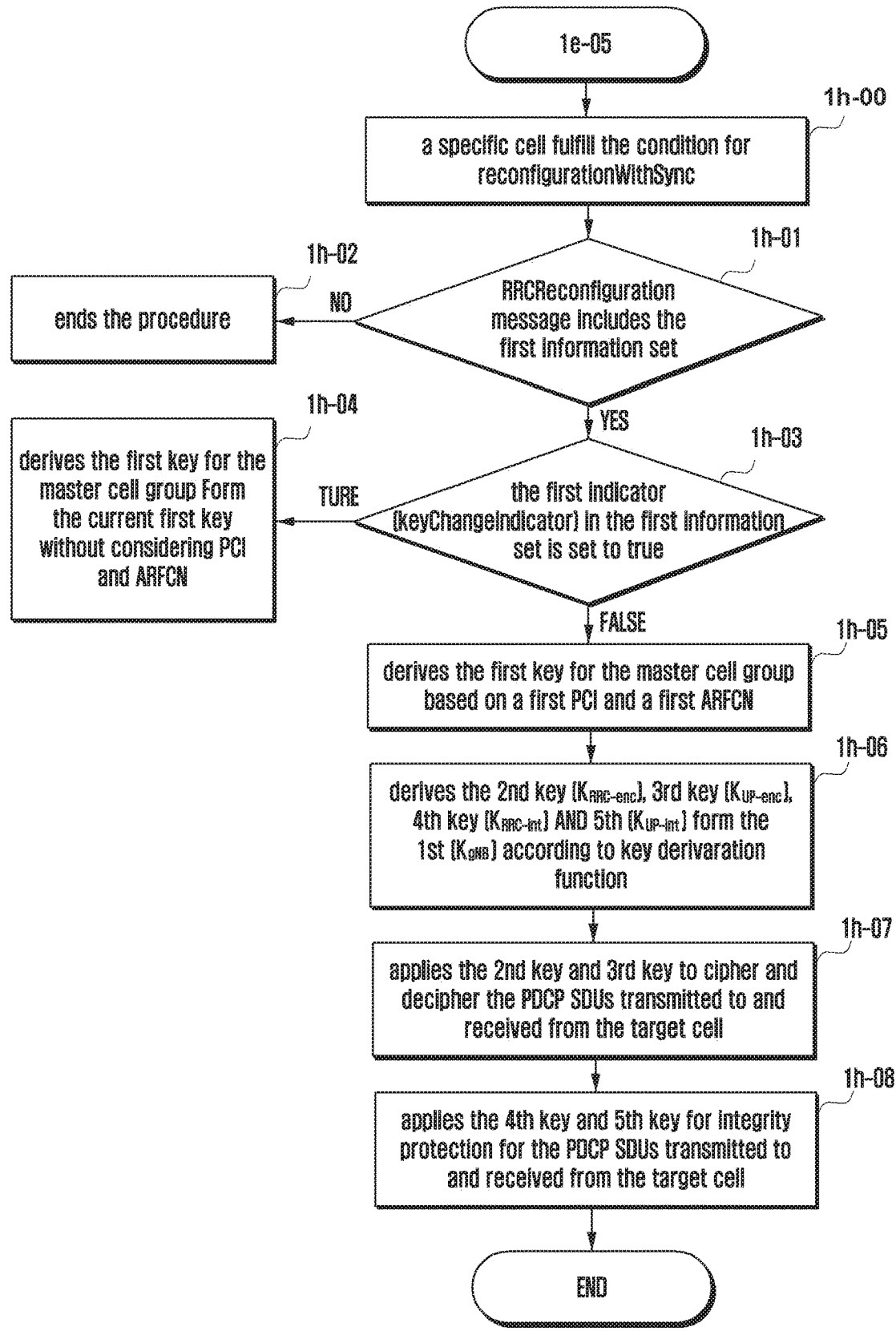
FIG. 1H is a diagram illustrating an order of UE operations performed in a case when a time alignment timer (TAT) of a primary secondary cell (PSCell) is expired while a configured secondary cell group (SCG) is inactive according to an embodiment of the disclosure.

FIG. 1H is a diagram illustrating an order of UE operations performed in a case when a time alignment timer (TAT) of a primary secondary cell (PSCell) is expired while a configured secondary cell group (SCG) is inactive according to an embodiment of the disclosure.

Referring to FIG. 1H, the UE evaluate whether a specific cell fulfills the condition for reconfigurationWithSync (i.e., certain condition related with a specific measurement identity is fulfilled or conditional reconfiguration should be executed) operation 1h-00. If a cell fulfills the condition, the UE goes to 1h-01. The specific cell is the cell of which configuration information is included in the RRCReconfiguration message. The condition is about the radio quality of the cell, and configuration information included in the RRCReconfiguration message is conditionally executed when the associated condition is met. For conditional reconfiguration, an outer RRCReconfiguration message can include multiple inner RRCReconfiguration. Each of inner RRCReconfiguration message is relevant to (or associated with) a cell. The UE determines whether one of inner RRCReconfiguration message associated with the specific cell fulfilling the condition includes the first information set (masterKeyUpdate) related to key update for the Master cell group operation 1h-01.

If the RRCReconfiguration message does not include the first information set, the UE ends the key update procedure without key update operation 1h-02.

If the RRCact includes the first information set, the UE goes to operation 1h-03 to start key update procedure.

The UE determines whether the first indicator (keyChangeIndicator) in the first information set is set to true operation 1h-03.

If it is set to true, the UE derives the first key for the master cell group without considering PCI and ARFCN operation 1h-04. The first key for the master cell group is derived from the current first key using a specific KDF (Key Derivation Function).

If the first indicator in the first information set is set to false, the UE derives the first key for the master cell group based on a first PCI and a first ARFCN among multiple PCIs and multiple ARFCNs contained in the inner RRC message operation 1h-05. The first PCI is the PCI included in the 1st IE of the RRCReconfiguration message. RRCReconfiguration message can include multiple PCIs. A PCI can be included in the 1st IE, 2nd IE, 3rd IE or 4th IE. The 1st IE is spCellConfigCommon in reconfigurationWithSync in spCellConfig in cellGroupConfig for masterCellGroup. The $1^{st}$ IE is the set of information on the primary cell of master cell group after handover. The 2nd IE is sCellConfigCommon in sCellToAddModList in CellGroupConfig for masterCellGroup. The $2^{nd}$ IE is the set of information on the secondary cells to be used after handover. The 3rd IE is spCellConfigCommon in reconfigurationWithSync in spCellConfig in cellGroupConfig for mrdc-SecondaryCellGroupConfig. The $3^{rd}$ IE is set of information on the primary cell of secondary cell group. The 4th IE is sCellConfigCommon in sCellToAddModList in CellGroupConfig for mrdc-SecondaryCellGroupConfig. The $4^{th}$ IE is set of information on the secondary cells of secondary cell group. The first ARFCN is the first ARFCN indicated in the 5th IE (FrequencyInfoDL within spCellConfigCommon within reconfigurationWithSync within spCellConfig within CellGroupConfig for master cell group) of the RRCReconfiguration message if the 5th IE is included in the RRCReconfiguration message. A RRCReconfiguration message can include multiple ARFCNs as followings. Two ARFCNs can be included in 5th IE, 6th IE, 7th IE and 8th IE. The first ARFCN indicates the center frequency of a cell (or reference signal representing the cell). The second ARFCN indicates the lower end frequency of a cell. The 5th IE is FrequencyInfoDL in spCellConfigCommon in reconfigurationWithSync in spCellConfig in cellGroupConfig for masterCellGroup. The $5^{th}$ IE is subset of $1^{st}$ IE and includes frequency relation information for a specific cell corresponding to $1^{st}$ IE. The 6th IE is FrequencyInfoDL in sCellConfigCommon in sCellToAddModList in CellGroupConfig for masterCellGroup. The $6^{th}$ IE is subset of $2^{nd}$ IE and includes frequency relation information for a specific cell corresponding to $2^{nd}$ IE. The 7th IE is FrequencyInfoDL in spCellConfigCommon in reconfigurationWithSync in spCellConfig in cellGroupConfig for mrdc-SecondaryCellGroupConfig. The $7^{th}$ IE is subset of $3^{rd}$ IE and includes frequency relation information for a specific cell corresponding to $3^{rd}$ IE. The 8th IE is FrequencyInfoDL in sCellConfigCommon in sCellToAdd- ModList in CellGroupConfig for mrdc-SecondaryCell-GroupConfig. The $8^{th}$ IE is subset of $4^{th}$ IE and includes frequency relation information for a specific cell corresponding to $4^{th}$ IE. The first ARFCN is the ARFCN having used to derive the current first key for the master cell group if the 5th IE is not included in the RRCReconfiguration message The UE derives the 2nd key ($K_{RRC-enc}$), 3rd key ($K_{UP-enc}$), 4th key ($K_{RRC-int}$) and 5th key ($K_{UP-int}$) from the 1st key ($K_{gNB}$) according to key derivation function operation 1h-06.

The UE applies the 2nd key and 3rd key to cipher and decipher the PDCP SDUs transmitted to and received from the target cell operation 1h-07.

The UE applies the 4th key and 5th key for integrity protection for the PDCP SDUs transmitted to and received from the target cell operation 1h-08.

Figure 1I:
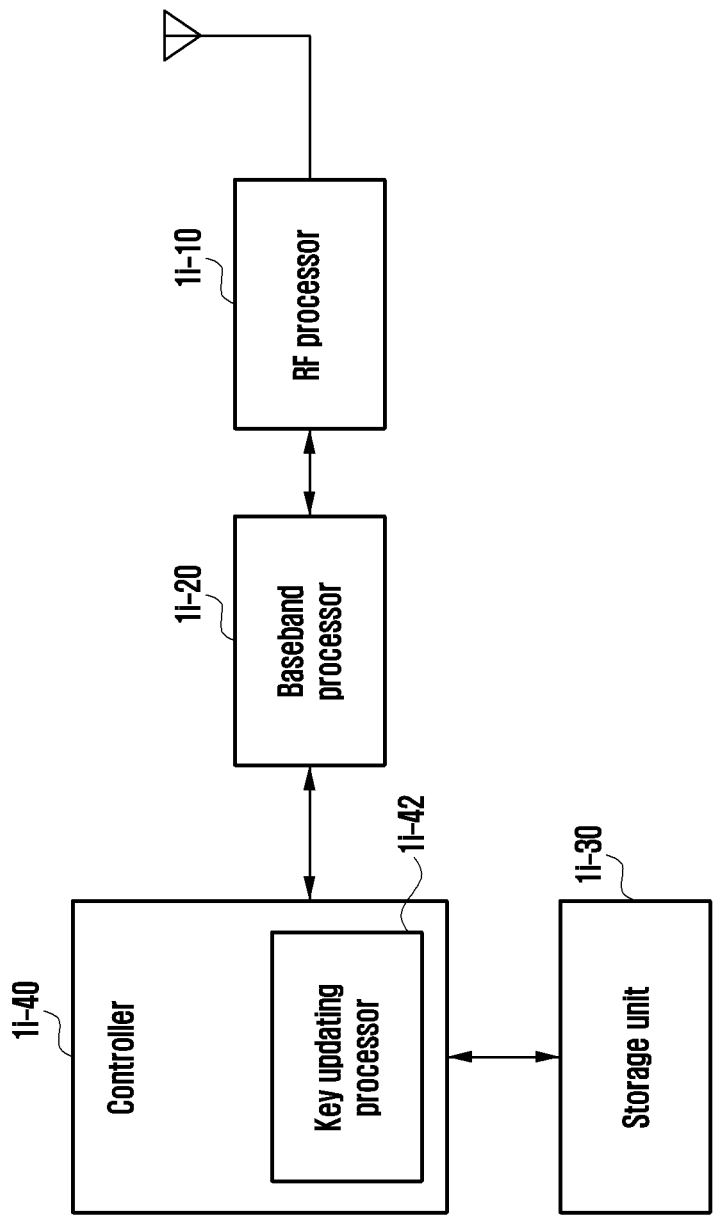
FIG. 1I is a diagram illustrating a block configuration of a UE according to an embodiment of the disclosure.

FIG. 1I is a diagram illustrating a block configuration of a UE according to an embodiment of the disclosure.

Referring to FIG. 1I, the UE may include a radio frequency (RF) processor 1i-10, a baseband processor 1i-20, a storage unit 1i-30, and a controller 1i-40.

The RF processor 1i-10 performs a function, such as signal band change, amplification, and the like, for transmitting or receiving a signal through a wireless channel. For example, the RF processor 1i-10 may upconvert a baseband signal provided from the baseband processor 1i-20, into an RF band signal, and then transmit the RF band signal through an antenna, and may downconvert an RF band signal received through the antenna, into a baseband signal. For example, the RF processor 1i-10 may include a transmission filter, a reception filter, an amplifier, a mixer, an oscillator, a digital-to-analog converter (DAC), an analog-to-digital converter (ADC), and the like. In FIG. 1I, only one antenna is illustrated, but the UE may include a plurality of antennas. In addition, the RF processor 1i-10 may include a plurality of RF chains. Moreover, the RF processor 1i-10 may perform beamforming. To perform the beamforming, the RF processor 1i-10 may adjust the phase and size of each of signals transmitted or received through a plurality of antennas or antenna elements.

The baseband processor 1i-20 performs a function of conversion between a baseband signal and a bit stream according to a physical layer protocol of a system. For example, when data is transmitted, the baseband processor 1i-20 generates complex symbols by encoding and modulating a transmission bit stream. In addition, when data is received, the baseband processor 1i-20 reconstructs a reception bit stream by demodulating and decoding a baseband signal provided from the RF processor 1i-10. For example, in a case where an orthogonal frequency division multiplexing (OFDM) scheme is applied, when data is transmitted, the baseband processor 1i-20 generates complex symbols by encoding and modulating a transmission bit stream, maps the complex symbols to subcarriers, and then configures OFDM symbols through inverse fast Fourier transform (IFFT) calculation and cyclic prefix (CP) insertion. In addition, when data is received, the baseband processor 1i-20 divides a baseband signal provided from the RF processor 1i-10, by the units of OFDM symbols, reconstructs signals mapped to subcarriers, through fast Fourier transform (FFT) calculation, and then reconstructs a reception bit stream through demodulation and decoding.

The baseband processor 1i-20 and the RF processor 1i-10 transmit and receive a signal as described above. Accordingly, the baseband processor 1i-20 and the RF processor 1i-10 may be called a transmitter, a receiver, a transceiver, or a communication unit. In addition, at least one of the baseband processor 1i-20 and the RF processor 1i-10 may include different communication modules to process signals in different frequency bands. The different frequency bands may include a super high frequency (SHF) (e.g., 2.5 GHz and 5 GHz) band, a millimeter (mm) wave (e.g., 60 GHz) band, and the like.

The storage unit 1i-30 stores data such as a basic program, an application program, and configuration information for an operation of the UE.

The controller 1i-40 controls overall operations of the UE. For example, the controller 1i-40 transmits or receives a signal through the baseband processor 1i-20 and the RF processor 1i-10. In addition, the controller 1i-40 records and reads data in and from the storage unit 1i-30. To this end, the controller 1i-40 may include at least one processor. For example, the controller 1i-40 may include a communication processor (CP) performing a control for communication, and an application processor (AP) controlling a higher layer, such as an application program. According to an embodiment of the disclosure, the controller 1i-40 may include a key updating processor 1i-42 performing a key updating operation. For example, the controller 1i-40 may control the UE to perform the procedures related to the operation of the UE, illustrated in FIGS. 1D-1H. The controller 1i-40 and the RF processor 1i-10 and the baseband processor 1i-20 are not necessarily implemented as separate modules, and may be implemented as one component in the type of a single chip. The controller 1i-40 and the RF processor 1i-10 and the baseband processor 1i-20 may be electrically connected. For example, the controller 1i-40 may be a circuit, an application-specific circuit, or at least one processor. Moreover, operations of the UE may be implemented by configuring a memory device which stores program codes corresponding to the operations, in a component of the UE.

Figure 1J:
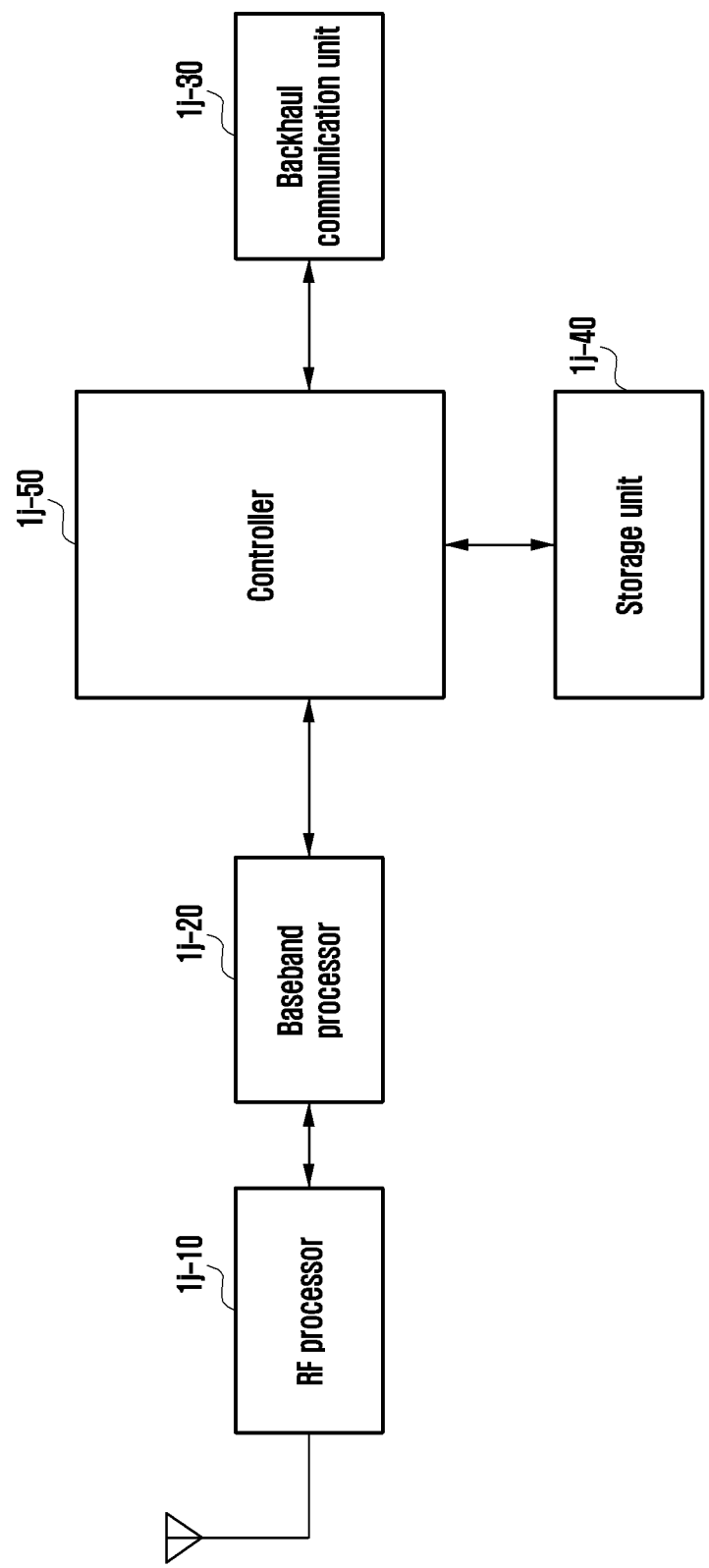
FIG. 1J is a diagram illustrating a block configuration of a base station according to an embodiment of the disclosure.

FIG. 1J is a diagram illustrating a block configuration of a base station according to an embodiment of the disclosure.

Referring to FIG. 1J, the base station may include a radio frequency (RF) processor 1j-10, a baseband processor 1j-20, a backhaul communication unit 1j-30, a storage unit 1j-40, and a controller 1j-50.

The RF processor 1j-10 performs a function, such as signal band change, amplification, and the like, for transmitting or receiving a signal through a wireless channel. For example, the RF processor 1j-10 may upconvert a baseband signal provided from the baseband processor 1j-20, into an RF band signal, and then transmit the RF band signal through an antenna, and may downconvert an RF band signal received through the antenna, into a baseband signal. For example, the RF processor 1j-10 may include a transmission filter, a reception filter, an amplifier, a mixer, an oscillator, a digital-to-analog converter (DAC), an analog-to-digital converter (ADC), and the like. In FIG. 1J, only one antenna is illustrated, but the base station may include a plurality of antennas. In addition, the RF processor 1j-10 may include a plurality of RF chains. Moreover, the RF processor 1j-10 may perform beamforming. To perform the beamforming, the RF processor 1j-10 may adjust the phase and size of each of signals transmitted or received through a plurality of antennas or antenna elements. The RF processor 1j-10 may perform a downlink MIMO operation by transmitting at least one layer.

The baseband processor 1j-20 performs a function of conversion between a baseband signal and a bit stream according to a physical layer protocol of a system. For example, when data is transmitted, the baseband processor 1j-20 generates complex symbols by encoding and modulating a transmission bit stream. In addition, when data is received, the baseband processor 1j-20 reconstructs a reception bit stream by demodulating and decoding a baseband signal provided from the RF processor 1j-10. For example, in a case where an orthogonal frequency division multiplexing (OFDM) scheme is applied, when data is transmitted, the baseband processor 1j-20 generates complex symbols by encoding and modulating a transmission bit stream, maps the complex symbols to subcarriers, and then configures OFDM symbols through inverse fast Fourier transform (IFFT) calculation and cyclic prefix (CP) insertion. In addition, when data is received, the baseband processor 1j-20 divides a baseband signal provided from the RF processor 1j-10, by the units of OFDM symbols, reconstructs signals mapped to subcarriers, through FFT calculation, and then reconstructs a reception bit stream through demodulation and decoding. The baseband processor 1j-20 and the RF processor 1j-10 transmit and receive a signal as described above. Accordingly, the baseband processor 1j-20 and the RF processor 1j-10 may be called a transmitter, a receiver, a transceiver, a communication unit, or a wireless communication unit.

The backhaul communication unit 1j-30 provides an interface for performing communication with other nodes within a network.

The storage unit 1j-40 stores data, such as a basic program, an application program, and configuration information for an operation of the base station. More particularly, the storage unit 1j-40 may store information relating to a bearer assigned to a connected UE, a measurement result reported from a connected UE, and the like. In addition, the storage unit 1j-40 may store information serving as a determination criterion of whether to provide or stop providing multi-connection to a UE. The storage unit 1j-40 provides stored data in response to a request of the controller 1j-50.

The controller 1j-50 controls overall operations of the base station. For example, the controller 1j-50 transmits or receives a signal through the baseband processor 1j-20 and the RF processor 1j-10, or through the backhaul communication unit 1j-30. In addition, the controller 1j-50 records and reads data in and from the storage unit 1j-40. To this end, the controller 1j-50 may include at least one processor. The controller 1j-50 and the RF processor 1j-10 and the baseband processor 1j-20 are not necessarily implemented as separate modules, and may be implemented as one component in the type of a single chip. The controller 1j-50 and the RF processor 1j-10 and the baseband processor 1j-20 may be electrically connected. For example, the controller 1j-50 may be a circuit, an application-specific circuit, or at least one processor. Moreover, operations of the base station may be implemented by configuring a memory device which stores program codes corresponding to the operations, in a component of a UE.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
    receiving, from a base station, a message including information on at least one serving cell;
    determining whether the message includes a first absolute radio frequency channel number (ARFCN) for a specific serving cell;
    determining a first key for a master cell group based on a first physical cell identity (PCI) for the specific serving cell and the first ARFCN for the specific serving cell, in case that the message includes the first ARFCN for the specific serving cell; and
    determining the first key for the master cell group based on the first PCI for the specific serving cell and a second ARFCN used to determine a current first key for the master cell group, in case that the message does not include the first ARFCN for the specific serving cell.

2. The method of claim 1, further comprising:
    identifying that the message includes information for indicating whether the first PCI and the first ARFCN is used to determine the first key; and
    determining the first key based on a current first key for the master cell group, in case that the information indicates the first PCI and the first ARFCN is not used to determine the first key.

3. The method of claim 2, wherein the determining of whether the message includes the first ARFCN for the specific serving cell comprises:
    determining whether the message includes the first ARFCN for the specific serving cell, in case that the information indicates the first PCI and the first ARFCN is used to determine the first key.

4. The method of claim 1, wherein the information on the at least one serving cell comprises the first PCI and two ARFCN for the specific serving cell.

5. The method of claim 4, wherein the first ARFCN among the two ARFCN indicates a center frequency of a reference signal of the specific serving cell and a second ARFCN indicates a lower end frequency of the specific serving cell.

6. The method of claim 1, wherein the specific serving cell includes a primary cell of the master cell group.

7. The method of claim 1, wherein the first ARFCN for the specific serving cell is listed in the message prior to an ARFCN for another serving cell.

8. A terminal in a wireless communication system, the terminal comprising:
a transceiver; and
a controller configured to:
receive, from a base station via the transceiver, a message including information on at least one serving cell,
determine whether the message includes a first absolute radio frequency channel number (ARFCN) for a specific serving cell,
determine a first key for a master cell group based on a first physical cell identity (PCI) for the specific serving cell and the first ARFCN for the specific serving cell, in case that the message includes the first ARFCN for the specific serving cell, and
determine the first key for the master cell group based on the first PCI for the specific serving cell and a second ARFCN used to determine a current first key for the master cell group, in case that the message does not include the first ARFCN for the specific serving cell.

9. The terminal of claim 8, wherein the controller is further configured to:
identify that the message includes information for indicating whether the first PCI and the first ARFCN is used to determine the first key, and
determine the first key based on a current first key for the master cell group, in case that the information indicates the first PCI and the first ARFCN is not used to determine the first key.

10. The terminal of claim 9, wherein the controller is further configured to:
determine whether the message includes the first ARFCN for the specific serving cell, in case that the information indicates the first PCI and the first ARFCN is used to determine the first key.

11. The terminal of claim 8, wherein the information on the at least one serving cell comprises the first PCI and two ARFCN for the specific serving cell.

12. The terminal of claim 11, wherein the first ARFCN among the two ARFCN indicates a center frequency of a reference signal of the specific serving cell and a second ARFCN indicates a lower end frequency of the specific serving cell.

13. The terminal of claim 8, wherein the specific serving cell includes a primary cell of the master cell group.

14. The terminal of claim 8, wherein the first ARFCN for the specific serving cell is listed in the message prior to an ARFCN for another serving cell.

* * * * *